(12) United States Patent
Rawlings

(10) Patent No.: US 10,599,710 B2
(45) Date of Patent: Mar. 24, 2020

(54) SYSTEM AND METHOD FOR GENERATING DIGITAL INFORMATION AND ALTERING DIGITAL MODELS OF COMPONENTS WITH SAME

(71) Applicant: Radix Inc.

(72) Inventor: Ross Rawlings, Maidstone (CA)

(73) Assignee: Radix Inc., Maidstone (CA)

( * ) Notice: Subject to any disclaimer, the term of this patent is extended or adjusted under 35 U.S.C. 154(b) by 373 days.

(21) Appl. No.: 15/287,100

(22) Filed: Oct. 6, 2016

(65) Prior Publication Data

US 2017/0098014 A1    Apr. 6, 2017

Related U.S. Application Data

(60) Provisional application No. 62/238,066, filed on Oct. 6, 2015.

(51) Int. Cl.
| | |
|---|---|
| *G06F 16/58* | (2019.01) |
| *G06F 16/583* | (2019.01) |
| *G06F 16/51* | (2019.01) |
| *G06K 9/46* | (2006.01) |
| *G06K 9/32* | (2006.01) |

(52) U.S. Cl.
CPC ............ *G06F 16/583* (2019.01); *G06F 16/51* (2019.01); *G06K 9/3216* (2013.01); *G06K 9/46* (2013.01)

(58) Field of Classification Search
CPC . G06F 17/50; G06F 17/30247; G06F 17/3028
USPC .......................................................... 703/1
See application file for complete search history.

(56) References Cited

U.S. PATENT DOCUMENTS

| | | | |
|---|---|---|---|
| 5,338,198 A | 8/1994 | Wu et al. | |
| 2002/0036617 A1* | 3/2002 | Pryor | G06F 3/042 |
| | | | 345/156 |
| 2008/0075351 A1* | 3/2008 | Smith | G06F 1/1626 |
| | | | 382/141 |

(Continued)

FOREIGN PATENT DOCUMENTS

CA        2891036 A1     5/2014

OTHER PUBLICATIONS

Vision_Systems_2004 (Vision and Scanning Probes Inspect Photomask Defects, Jul. 1, 2002 downloaded from https://www.vision-systems.com/articles/print/volume-9/issue-7/features/profile-in-vision . . . ).*

(Continued)

*Primary Examiner* — Brian S Cook
(74) *Attorney, Agent, or Firm* — Young Basile Hanlon & MacFarlane, P.C.

(57) ABSTRACT

Digital information to be associated with a component can be generated and used to alter a digital model of the component. A line of sight to at least a portion of a marking device and the component can be detected, and at least one of an orientation or a position of an endpoint of the marking device relative to the component can be determined using the line of sight. Digital information indicative of the at least one of the orientation or the position of the endpoint relative to the component can be generated responsive to the endpoint of the marking device contacting the component. The digital information can be used to alter a digital model based on defects of the component corresponding to portions contacted by the endpoint of the marking device.

20 Claims, 5 Drawing Sheets

(56) References Cited

U.S. PATENT DOCUMENTS

| | | | | |
|---|---|---|---|---|
| 2015/0182293 A1* | 7/2015 | Yang | ...................... | A61B 5/064 |
| | | | | 600/424 |
| 2017/0052610 A1* | 2/2017 | Large | .................. | G06F 3/03545 |
| 2018/0276810 A1* | 9/2018 | Wang | ..................... | G01B 11/24 |

OTHER PUBLICATIONS

Mango_2007 ( Mult-image Analysis GUI: downloaded from http://ric.uthscsa.edu/mango/mango_guide_file.html google index date of Jul. 8, 2007).*

Mango_2007 ( Mult-image Analysis GUI: downloaded from http://ric.uthscsa.edu/mango/mango_guide_file.html google index date of Jul. 8, 2007). (Year: 2007).*

Wolfe_2014 (Tailoring AutoCAD P&ID and AutoCAD Plant 3D, Created for Autodesk by ECAD, Inc. Mar. 14, 2014) (Year: 2014).*

* cited by examiner

SYSTEM AND METHOD FOR GENERATING DIGITAL INFORMATION AND ALTERING DIGITAL MODELS OF COMPONENTS WITH SAME

CROSS REFERENCE TO RELATED APPLICATION(S)

The present disclosure claims the benefit of U.S. Provisional Application No. 62/238,066, filed Oct. 6, 2015, entitled "Method and Apparatus for Generating Digital Notes for the Enhanced Inspection of a Work Piece," the disclosure of which is herein incorporated by reference.

TECHNICAL FIELD

The present disclosure relates generally to generating digital information and altering digital models of components with same.

BACKGROUND

Components of various industries are typically inspected at some point during a manufacturing process, for example, for quality assurance and compliance purposes. The more complex the component, the more likely it is that there will be multiple inspections during the course of its manufacture. Various methods of inspection can be performed, including but not limited to visual inspection, microscopic inspection, ultrasound inspection, eddy current inspection, and X-ray inspection. These and other methods of inspection can be used to identify defects about a component, which defects can be resolved to prepare the component for its intended use.

SUMMARY

Disclosed herein are systems and methods for generating digital information and altering digital models of components with same.

In some implementations, a system is provided for generating digital information associated with a component and altering a digital model of the component using the digital information. The system comprises a marking device and a computing device. The marking device includes an endpoint disposed at an end of an elongate body. The computing device includes a memory, a processor, and an imaging device. The memory includes instructions executable by the processor to determine at least one of an orientation or a position of the endpoint relative to the component detected using a line of sight of the imaging device; generate the digital information responsive to the endpoint of the marking device contacting the component, wherein the digital information is indicative of the at least one of the orientation or the position; and alter the digital model according to the digital information.

In some implementations, a method is provided for generating digital information associated with a component and altering a digital model of the component using the digital information. The method comprises detecting a line of sight to at least a portion of a marking device and the component; determining at least one of an orientation or a position of an endpoint of the marking device relative to the component using the line of sight; generating the digital information responsive to the endpoint of the marking device contacting the component, wherein the digital information is indicative of the at least one of the orientation or the position of the endpoint relative to the component; and altering a digital model according to the digital information.

In some implementations, a system is provided for generating digital information associated with a component and altering a digital model of the component using the digital information. The system comprises a marking device, an imaging device, and a computing device. The marking device includes an endpoint disposed at an end of an elongate body and a first target coupled to the elongate body. The imaging device includes a line of sight detecting the first target and a second target coupled to the component. The computing device including a memory and a processor, wherein the memory includes instructions executable by the processor to calibrate the first target to the second target based on positions and orientations of the marking device and the component detected in the line of sight; determine a contact between the endpoint and a portion of the component based on positions and orientations of the endpoint with respect to the portion of the component detected using the calibrated first and second targets; receive a command to associate the portion of the component with a defect of a list of defects detectable for the component; generate the digital information to indicate an association between the portion of the component and the defect; and alter a portion of the digital model corresponding to the portion of the component based on the digital information.

Details of these implementations, modifications of these implementations and additional implementations are described below.

BRIEF DESCRIPTION OF THE DRAWING

The description herein makes reference to the accompanying drawings wherein like reference numerals refer to like parts throughout the several views.

DETAILED DESCRIPTION

When a defect is identified while inspecting a component, the location of the defect with respect to the component can be carefully noted so that the defect can be corrected. Having notes indicating the specific location of a defect about a component can expedite the repair process to prepare the component for its intended use. However, the location of the defect is typically noted directly on the actual component, which direct noting at the best can introduce additional obstacles for preparing the component for its intended use and at worst can introduce a contaminant or otherwise disfigure the component.

Implementations of the present disclosure include generating digital information and annotating digital models of components using the digital information. A digital model of a component can be generated as part of the manufacturing process. The digital model can include a multi-dimensional representation of the component and be stored, for example, in a file interpretable by Computer Aided Design (CAD) software. Digital information can be generated such that information indicating a defect about a component with specificity can be provided without physically altering the component itself. The digital information can include virtual markups or annotations to the digital model, digital notes describing the component or defect, or the like. The digital information can be reviewed in later stages of the manufacturing process, for example, by persons tasked with repairing the component according to the digital information generated in connection with the digital model of the component.

Figure 1:
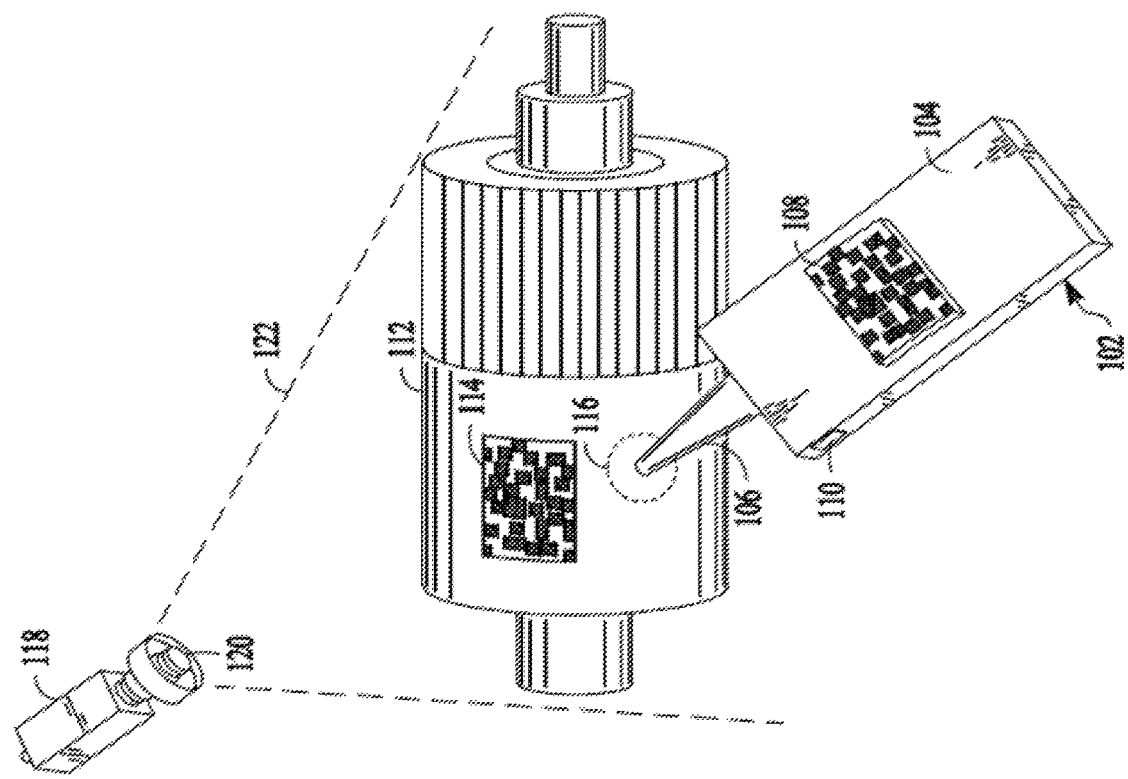
FIG. 1 is a diagram of an example of a system for generating digital information and altering digital models of components with same.
Figure 1:
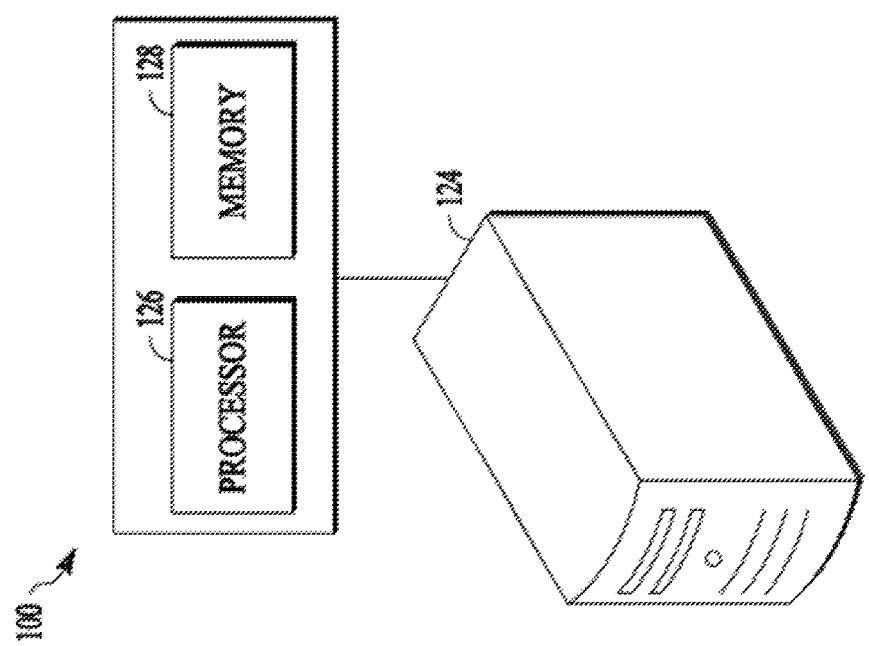

FIG. 1 is a diagram of an example of a system 100 for generating digital information and altering digital models of components with same. System 100 comprises a marking device 102, an imaging device 118, and a computing device 124. System 100 can be used to inspect a component 112 and generate digital information based on a defect at a portion of component 112 contacted by the marking device 102. The marking device 102 is a handheld tool including a body 104, an endpoint 106, a target 108, and an input element 110. In some implementations, the body 104 can be an elongate body in which the endpoint 106 is disposed at an end distal from an end to be held by a user. The endpoint is configured to contact all or a portion 116 of the component 112 without causing a physical change to the component 112.

The endpoint 106 can be comprised of a conductive, non-conductive, composite, metal, felt, or other material or combination thereof. In some implementations, the material of which the endpoint 106 is comprised can be selected based on a material of which the component 112 is comprised. For example, where the component 112 is comprised of a material having low resistance to pressure, the endpoint 106 can be comprised of a soft material incapable of applying damaging pressure to the component 108. In some implementations, an adapter (not shown) can be coupled to the endpoint 106 to facilitate contact between the endpoint 106 and a portion 116 of the component 112. For example, where the component 112 is large or formed from complex surfaces, an adapter can be removably coupled to the endpoint 114 to extend the reach or curvature of the endpoint 114 to a user-definable length or degree, respectively.

The input element 110 includes a user interface, for example, a button or other element that when toggled causes the marking device 102 to generate or transmit data. The data can include information indicating that a defect has been identified about the component 112. In some implementations, the marking device 102 can include a communications element for transmitting the data to another device, such as the computing device 124 described below.

The target 108 can be monitored during use operations of the marking device 102 to identify current positions or orientations of the endpoint 106 relative to the component 112. The target 108 is coupled to a portion of the body 104 an includes at least one face having pattern elements that can be detected by the imaging device 118, which at least one face is generally planar to the body 104. In some implementations, the target 108 can be radially coupled to an end of body 104 distal to the endpoint 106. The pattern elements of the face of the target 108 can encode a number to uniquely identify the marking device 102 to which the target 108 is coupled.

In some implementations, the pattern elements can represent a Data Matrix symbol configured to indicate a position or orientation of the marking device 102. For example, the pattern elements of the face of the target 108 can support a 23-bit address space configured to indicate 8,388,608 distinct identifiers. In another example, the pattern elements can indicate 65,356 or 256 distinct identifiers using error correction techniques for example, varying degrees of Reed-Solomon error correction. In some implementations, the target 108 can also or instead indicate other information usable to determine the position or orientation of the marking device 102. For example, the face of the target 108 can include a meter indicating a three-dimensional position or six- or nine-dimensional rotation when calibrated to a point of origin.

In some implementations, the marking device 102 can include a plurality of targets 108 such that respective targets of the plurality can be positioned at discrete locations relative to the marking device 102. The imaging device 118 can detect a position or orientation of the marking device 102 with respect to the component 112 using respective pattern elements of the respective targets of the plurality. In some implementation, the marking device 102 can include a single target 112 having multiple distinct planar surfaces, wherein respective planar surfaces can include distinct pattern elements for separately tracking the positions or orientations thereof or common pattern elements for collectively tracking the position or orientation thereof. Implementations of a marking device 102 having multiple targets 108 or a single target 108 with multiple faces are discussed below with respect to FIG. 3.

The imaging device 118 is configured to detect a position or orientation of the endpoint 106 relative to the component 112. The imaging device 118 includes a sensor 120, which sensor 120 can be, for example, a camera or other image-sensing or video-sensing element. The sensor 120 can have a range of vision with respect to an area to which it is directed, which range of vision can also be referred to as a line of sight of the imaging device 118. In some implementations, the imaging device 118 can calibrate the target 108 based on intrinsic measurement parameters of the imaging device 118, for example, X- and Y-axis focal lengths, principal points, or distortion parameters.

The imaging device 118 can be any hardware or software implement capable of using video imaging to identify the target 108 when target 108 enters the line of sight 122. In some implementations, the imaging device 118 can be mounted about a workstation (not shown) at which the component 108 can be inspected. In some implementations, the imaging device 118 can be included as part of a computing device 124 (e.g., as a built-in camera). Although a single imaging device 118 is shown in FIG. 1, in some implementations, a plurality of imaging devices 118 can be included in the system 100. This can be beneficial in that a greater total volume of inspection space (e.g., by combining respective lines of sight 122 of respective imaging devices 118) can be provided for using a plurality of imaging devices 118. However, using a plurality of imaging devices 118 might include reconciling coordinate planes corresponding to the respective lines of sight 122 thereof.

For example, where two imaging devices 118 are used, one such imaging device can be designated as a primary, or master, imaging device and the other such imaging device can be designated as a secondary, or slave, imaging device. The master imaging device can track the target 108 to identify a position and orientation of the marking device 102 relative to the component 108, whereas the slave imaging device can separately track the target 108 to identify the position and orientation of the marking device 102 relative to a coordinate plane of the master imaging device. In this way, the line of sight 122 of the slave imaging device 118 can extend the total line of sight 122 for detecting the position or orientation of the marking device 102.

In some implementations, a target 114 can be coupled to the component 112 such that a position or orientation of the component relative to the marking device 102 can be detected by the imaging device 118. In some implementations, data indicative of a position or orientation of the component 112 as detected via the target 114 can be used to calibrate the marking device 102. For example, the position or orientation of the target 114 can represent an origin position or orientation and an initial position or orientation of the target 108 can be calibrated to the target 114 by calculating a difference in respective positions or orientations of the target 108 and the target 114. In some implementations, the target 108 and the target 114 can have distinct coordinate planes in multi-dimensional space, such that the imaging device 118 can calibrate the target 108 and the target 114 based on the respective coordinate planes.

Once the target 108 is calibrated, the imaging device 118 can track the target 108 within the line of sight 122 to detect an initial position and orientation of the target 108 (and, therefore, the marking device 102) relative to component 108. Updated position or orientation information for the marking device 102 can be detected by the imaging device 118 responsive to changes in the position or orientation of the target 108 occurring within the line of sight 122. Further implementations for calibrating the target 108, the target 114, or the imaging device 118, or for detecting a position or orientation of the marking device 102 relative to the component 112, are described in U. S. Application Publication No. 2007/0188606 to Atkinson et al., entitled "Vision-Based Position Tracking System," published Aug. 16, 2007, the disclosure of which is herein incorporated by reference.

In some implementations, the target 108 or the target 114 can comprise a retroreflective fabric, which retroreflective fabric can cause the respective target to be more easily detectable by imaging device 118 or can otherwise improve a degree to which the respective target is visible to the imaging device 118, depending on the sensor 120 of the imaging device 118. For example, where the sensor 120 is a light sensor configured to detect the target 108 or the target 114 based on an amount of light reflected thereby, the retroreflective fabric can cause the sensor 120 to more easily detect the target 108 or the target 114.

The use of the marking device 102 might occasionally include orienting the marking device 102 such that the target 108 is faced substantially away from the imaging device 118. In such a situation, the retroreflective fabric of the target 108 can render the target 108 visible to the imaging device 118 even when the target 108 is only partially facing the imaging device 118, whereas the target 108 without retroreflective fabric might not otherwise be visible to imaging device 104 when so oriented, as less light may be reflected to imaging device 104.

In some implementations, the target 108 or the target 114 can comprise one or more distinct color planes for encoding instructions that can be processed by a computing device (e.g., the computing device 124). As discussed above and will be discussed further below, the pattern elements of a face of the target 108 or the target 114 includes information (e.g., expressed as a two-dimensional Data Matrix) for mapping data generated in connection with the marking device 102 to a digital model representative of the component 108. Accordingly, in some implementations, distinct color planes can include a number of bits that can be mapped to specific information. For example, a bit on a first color plane may indicate that an alteration to the digital model include metadata indicating a specific tool to be used when later resolving the corresponding defect.

The computing device 124 is a computer including a processor 126 and a memory 128, such as a laptop computer, desktop computer, smartphone, tablet computer, personal digital assistant, server computer, or the like. The computing device 124 can be a general-purpose or special-purpose computer in communication with at least one of the marking device 102 or the imaging device 118. The computing device 124 processes data received from the marking device 102 or the imaging device 118 to record positions or orientations of the marking device 102 relative to the component 112.

The processor 126 includes one or more central processing units. In some implementations, the processor 126 can be a microprocessor. In some implementations, the processor 126 can be any other type of device, or plurality of devices, capable of manipulating or processing information now-existing or hereafter developed. The processor 126 can be a single processor or multiple processors, wherein respective processors can have a number of cores, noting advantages in speed and efficiency can be achieved by using more than one processor.

The memory 128 can be a random access memory device (RAM) or other suitable type of non-transitory storage device. The memory 128 can include instructions executable by the processor 126 and data accessible by software executing or hardware operating in association with the computing device 124. The memory 128 can be coupled to the processor 126 via a bus. In some implementations, the memory 128 can further include an operating system and/or one or more application programs including software components in the form of computer executable program instructions that, when executed, cause the processor 126 to perform some or all of the operations and methods described herein.

Although not shown in FIG. 1, the computing device 124 can include additional functionality or components. In some implementations, the computing device 124 can include a communications component for facilitating communications of data between the computing device 124 and external hardware or software, for example, the imaging device 118, the marking device 102, or hardware operating or software executing outside of the system 100. The computing device 124 can communication with external hardware or software over a number of wired or wireless technologies. For example, the computing device 124 can use a wired communications link, such as a Local Area Network, Ethernet, Internet, data processing cable (e.g., HDMI, USB, or the like), or the like or a combination thereof. In another example, the computing device 124 can use a wireless communication technique to communicate with external hardware or software, for example, Wi-Fi, Bluetooth, IEEE 802 protocols, Near Field Communication, radio frequency, infrared, GSM, CDMA, or the like or a combination thereof.

In some implementations, the computing device 124 can include an input-output device for receiving input from a user of the computing device 124 and outputting data for viewing by the user. For example, the input-output device can be a keyboard and mouse configuration, a joystick, a touchscreen, or other implement for receiving user input; a display, such as an LCD, LED, CRT, or other display for displaying output; or the like or combinations thereof.

The computing device 124 can receive and process a digital file including data representative of a multi-dimensional digital model of the component 112. In some implementations, the digital file can be a CAD-type file interpretable by one or more application programs configured to interpret files having such extensions. In some implementations, the digital file can be of a format corresponding to stereolithographic CAD data, also known as an STL file, which is a non-parametric, triangulated representation of a typical three-dimensional CAD model having various applications (e.g., in the three-dimensional printing industry). Nevertheless, and notwithstanding the particular format thereof, the term "digital file" as used herein refers to any computer-interpretable data including a digital model of the component 108, which digital model depicts or represents all or a portion of the component 112 in a multi-dimensional space.

The system 100 can be used to inspect a component, such as the component 112, for defects and generate digital information to alter a digital model of the component according to the identified defect such that the component 112 itself remains physically unaltered. In some implementations, the system 100 can also be used, or a system similar to the system 100 can be used, to resolve defects of a component based on the altered digital model of the component or other information associated with the digital information. For example, the similar system can include a computing device such as the computing device 124, an imaging device such as the imaging device 118, a component such as the component 112, and a resolving device including a tool at an endpoint thereof usable for resolving the defect of the component. The component or the resolving device can include targets for identifying locations or orientations of the resolving device relative to the component, namely, with respect to a portion of the component corresponding to a defect, as indicated by the altered digital model.

Figure 2:
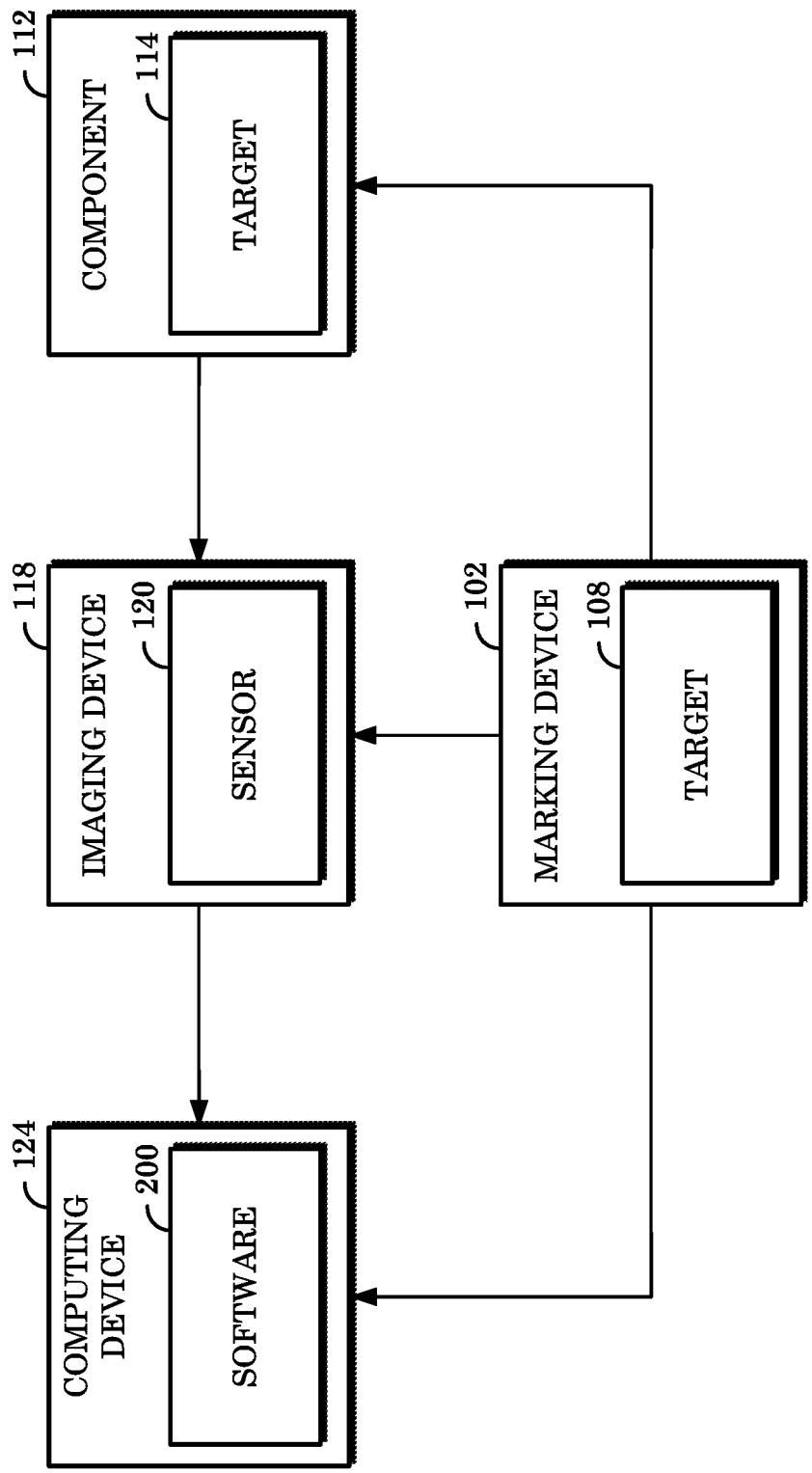
FIG. 2 is a block diagram of an example of data communicable within a system for generating digital information and altering digital models of components with same.

FIG. 2 is a block diagram of an example of data communicable within a system for generating digital information and altering digital models of components with same, such as the system 100 shown in FIG. 1. The digital information can be generated by contacting the marking device 102 to the component 112, wherein the contact is detectable by the imaging device 118 and communicated to the computing device 124. That is, in some implementations, the computing device 124 can generate the digital information based on data it receives, which data indicates one or more contacts between an endpoint of the marking device 102 and at least a portion of the component 112.

As used herein, the term "digital information" refers to any information, notes, measurements, or other data related to a component involved in an inspection using devices, systems, or the like for identifying defects about the component. In some implementations, digital information can be stored within a digital file that may be linked to a digital file comprising a digital model of a component, for example, an eXtensible Markup Language (XML) file. In some implementations, digital information can be stored in a same digital file as the digital model of a component. Other terms as may be used throughout this disclosure to refer to digital information, such as "digital inspection nodes," "digital notes," or the like refer to digital information unless explicitly indicated otherwise by the context.

As previously stated, digital information is generated responsive to the communication of data between some combination of the marking device 102, the component 112, the imaging device 118, or the computing device 124. The imaging device 118 can use a sensor 120 to detect a target 108 of the marking device 102 and a target 114 of the component 112. Data indicative of positions or orientations of the marking device 102 relative to the component 108 can thus be detected by the imaging device 118 and transmitted to the computing device 124. The computing device 124 can include software 200 (e.g., executed by a processor of the computing device 124) for receiving the transmitted data, processing the to generate digital information, and altering a digital model of the component 112 according to the digital information.

More particularly, the software 200 can receive a digital model of a component 112, for example, by a user selecting to open or otherwise import data from an STL file or the like. The software 200 can include a graphical user interface for facilitating commands to open files, visually display or alter digital models, or take other action. In some implementations, the software can listen to communications components of the computing device 124 (e.g., data received at the computing device 124 over Bluetooth) for commands (e.g., instructions or the like) transmitted from one or more of the imaging device 118 or the marking device 102. For example, a command can include instructions to alter a digital model according to digital information transmitted by the marking device 102. In another example, a command can include instructions to calculate a location or orientation of the marking device 102 relative to the component 112 based on how the sensor 120 perceives the target 108 or the target 114.

The software 200 can calculate an estimated proximity of an endpoint of the marking device 102 with respect to a portion of the component 200 to determine whether to generate digital information at a given time. A position or orientation of the marking device 102 can be determined by the software 200 using position or orientation data detected within a line of sight of the imaging device 118. For example, the software 200 can recognize a position or orientation of the endpoint as a Boolean value indicating whether a coordinate of the endpoint has intersected a coordinate region of the digital model. Thus, the software 200 can use coordinate systems of the component 112 and marking device 102 (e.g., identified by the imaging device 118 detecting the target 114 or the target 108, respectively) to determine whether such an intersection occurs.

The software 200 can also receive a list of defects detectable for a component 112, which list can be included in the STL file opened by or otherwise imported into the software 200, or which list can be stored separately from the STL file. The list can be expressed in a spreadsheet, comma-separated value, table, database, or other format. In some implementations, the list can include a complete list of defects that can be processed by the software 200 such that some of the defects of the list not applicable to a digital model rendered by the software 200 (e.g., to the corresponding component 112) might not be selectable by the user. Digital information can include metadata indicating a selection of one or more defects from the list of defects such that the software 200 can indicate the metadata in connection with an alteration to the digital model. For example, the metadata associated with a scratch-type defect can reflect that an alteration made to a digital model to indicate a scratch about a corresponding component 112 is to appear in red and include the character string "Scratch" superimposed above the red alteration.

In some implementations, the one or more defects can be selected by a user interacting with the software 200 before the marking device 102 contacts the component 112. For example, the user can pre-select a defect of the list within the software 200 such that a next contact between the marking device 102 and the component 112 is automatically associated by the software 200 with the selected defect. In some implementations, the one or more defects can be selected by a user interacting with the software 200 while or after the marking device 102 contacts the component 112. For example, the user can select a defect of the list at a time that the marking device 102 contacts the component 112 (e.g., by maintaining the contact while the selection is made). In another example, the user can select a defect of the list after the marking device 102 has contacted the component 112, such that an alteration to the digital model can be initially made based on the contact and then changed as necessary to reflect metadata associated with the selected defect.

In some implementations, responsive to being generated, digital information can be used to alter a digital model of the component 112. For example, where digital information is generated to indicate a defect appearing on a lower left corner of the component 112, the digital model can be correspondingly altered to reflect that a defect appears at a lower left corner of the digital model. In some implementations, the digital information can include data to be associated with the digital model. For example, the data of the digital information can indicate an annotation for visually altering the digital model, a processing instruction indicating a technique for resolving a defect corresponding to an annotation, a comment including additional information about the defect or subsequent resolution, or the like or a combination thereof. In some implementations, the alterations to the digital model or metadata associated therewith can be represented in a graphical layer of the software 200 separate from a layer on which the digital model itself is shown. In this way, the digital information can be selectively toggled on or off by a user of the software 200 to view the digital model unaltered or the digital model as altered by the digital information.

An annotation can be data used to alter an appearance of the digital model of the component 112 based on a defect detected about the component 112 by a user of the marking device 102. That is, the user can contact the endpoint of the marking device 102 to the portion of the component 112 including the defect to cause an annotation reflecting the defect to appear on a corresponding portion of the digital model. In some implementations, the annotations generated by the software 200 can have common appearances (e.g., black color, same line thickness, or the like). In some implementations, the annotations generated by the software 200 can have different appearances based on one or more of a user-configured setting for representing the annotation on the digital model or default settings within the software 200 for representing the annotation on the digital model. That is, different colors, line thicknesses, line styles (e.g., dashes, arrows, or the like), or the like or a combination thereof can represent different types of defects. For example, a first setting can indicate to use thin, solid, green lines to represent scratches or dents about the component 112, whereas a second setting can indicate to use thick, dashed, blue lines to represent inclusions or scaling issues.

In some implementations, the appearance of an annotation can be determined based on a length of time the endpoint of the marking device 102 contacts the portion of the component 112, an amount of pressure detected as applied by the marking device 102 on the component 112 via such contact, or the like or a combination thereof. For example, a thicker line can be used to represent annotations for altering a digital model where the endpoint of the marking device 102 remains in contact with the component 112 for longer than a configurable period of time (e.g., three seconds). In another example, tapping the endpoint of the marking device 102 to the component 112 can cause the resulting annotation to render in dashed lines, for example, where a style of dashing can be configured based on a number of taps used to contact the endpoint to the component 112. In another example, an increase in the pressure used by the endpoint to consecutively contact different portions of the component 112 (e.g., by tracing along a surface of the component) can cause the resulting annotation to have a darkening color corresponding to the increase such that a starting point of contact is represented on the digital model alteration as a light shade of a color and an ending point of contact is represented thereon as a dark shade of the same color.

A processing instruction is information to be used at a time after the inspection process for the component 112 completes, for example, during a subsequent process for resolving defects of the component 112 identified during the inspection process. The processing instructions can indicate a manner in which to resolve a defect of the component 112 indicated in the digital model (e.g., via an alteration). For example, a processing instruction can include a recommendation for a tool to use to repair a scratch in the component 112, an amount of torque to apply to a tool used to repair a dent in the component 112, an orientation in which to hold or position a tool to most effectively repair a crack in the component 112, or the like or a combination thereof. As such, processing instructions can be useful in many situations, such as where the person performing the inspection process is a different person from one who performs the resolving process, or where the resolving process occurs a long time after the inspection process completes. In some implementations, a user of the marking device 102 can interact with the software 200 (e.g., directly, such as by using an input device of the computing device 124, or indirectly, such as by transmitting data via the marking device 102) to input processing instructions in connection with an alteration to a digital model of the component 112. The processing instruction can be visually represented in association with a corresponding defect (e.g., by the alteration representing the defect including an icon indicating that a processing instruction exists for the defect) or indicated separate from the digital model (e.g., on a graphical user interface other than the one used to display the digital model to the user).

In some implementations, the processing instruction may further include a threshold measurement to be considered relative to the defect to be resolved for a component 112. For example, the threshold measurement can be indicative of a minimum completion measurement or a maximum completion measurement of the related measurement. The threshold measurement can also or instead indicate other conditions or requirements with respect to the component 112. In some implementations where the processing instruction is or includes a threshold, the processing instruction may be subjected to an override to obviate conformance therewith.

A comment is a plain-language note to be associated with an alteration to a digital model. A comment can include a string of characters of a length compatible with the software 200 and can be stored separately from an annotation or processing instruction or can be indicated, for example, by icons in proximity to an annotation or processing instruction. For example, a comment can include notes for a person handling resolutions of defects of the component 112 to handle a particular section of the component 112 with extra care due to fragility or degrading materials. In another example, a comment can include a checklist or other list of actions to be taken in connection with resolving a defect. In some implementations, a comment can be or include a code that uniquely identifies the person causing the comment to be generated during the inspection process, for example, so that a person handling resolutions of the defects identified therein can know who to contact should questions arise.

In some implementations, digital information can have a status associated with it to indicate a progress towards a stage of the inspection or resolution processes. The status for digital information can show a current action being taken (e.g., altering digital model according to instructions associated with identified defect, repairing crack indicated at lower right corner of the component, or the like). The status can be indicated visually, for example, in a graphical user interface of the software 200. In some implementations, a visual representation of a status can change based on a progress of an action corresponding to the status. For example, where the digital information includes an annotation to be visually depicted on a digital model, the status can include a meter showing progress of altering the digital file of the digital model, which meter can be removed from the graphical user interface upon the alteration completing.

Digital information can be generated based on commands received via a number of ways. In some implementations, a user of the marking device 102 can toggle a user interface element of the marking device (e.g., the input element 110 shown in FIG. 1), which toggling can transmit data to the computing device 124 or otherwise open a communication channel for transmitting data to the computing device 124. For example, the input element can be pressed to indicate that a defect has been identified such that a selection from a list of defects in the software is to be made. In some implementations, the software 200 can prevent a selection from the list of defects unless it receives an indication that the input element of the marking device 102 has been toggled. In some implementations, the toggling of the input element of the marking device 102 can send a command to the software 200 to generate digital information corresponding to a contact between the marking device 102 and the component 112.

In some implementations, the marking device 102 can include multiple input elements having dedicated functionality. For example, a first input element can be used to send a command to the software to alter a digital model with an annotation, whereas second input element can be used to send a command to associate a processing instruction or comment with the alteration. In another example, the first input element can indicate that the digital information is to be generated responsive to a contact between an endpoint of the marking device 102 and a portion of the component 112, whereas a second input element can indicate that at least some of the digital information is to derive from speech input. The functionality assigned to respective ones of the multiple input elements can be defined by the software 200, configured by a user of the marking device 102, or otherwise.

In some implementations, the computing device 124 can include functionality for recognizing speech input received from a microphone or similar input element. The speech input can include sounds recorded from a speaker (e.g., a user of the marking device 102) to indicate a defect of the component 112, a location of such a defect, a manner in which to alter a digital model according to such a defect, or the like or a combination thereof. The speech recognition functionality can be implemented as instructions stored in the memory and executable by the processor thereof, for example, as specialized software compatible with the software 200. In some implementations, the software 200 can include a speech recognition module for receiving and processing instructions from speech input. The speech recognition module or other instructions for processing speech input can translate the speech input into a form usable for generating digital information, such as text, shapes, or the like. In some implementations, a user can toggle the interface element of the marking device 102 to enable speech input to be received and processed by the software. In some implementations, the interface element of the marking device 102 can include a microphone for recording the speech input as it is spoken by the user, which speech input recording can then be transmitted by the marking device 102 to the computing device 124 for processing.

In some implementations where a system is used to resolve defects corresponding to an altered digital model of a component, a computing device of that system can receive the altered digital model and other digital information, as applicable, which can indicate a portion of the component to be contacted by the resolving device to resolve the defect. A graphical user interface displayed at the computing device can show a position or orientation of the resolving device relative to the portion of the component to be contacted thereby. The resolving device can include removably coupled endpoints having distinct tool features to resolve various defects of a component. In some implementations, multiple resolving devices having distinct tool features coupled to endpoints thereof can be used. For example, the resolving devices can include a user interface element for selecting a single resolving device to use to resolve a defect at a given time. This can prevent data mismatches or conflicts from arising within the software processed by the computing device. The position or orientation of a resolving device can be tracked by the computing device (e.g., using the imaging device of the system) to identify a contact between an endpoint of the resolving device and the portion of the component corresponding to the component. In some implementations, an altered digital model of the component can be unaltered or altered again (as applicable) to respectively indicate that a defect has been resolved or that other changes not related to a defect indicated in the altered digital model have been made by the user.

Figure 3:
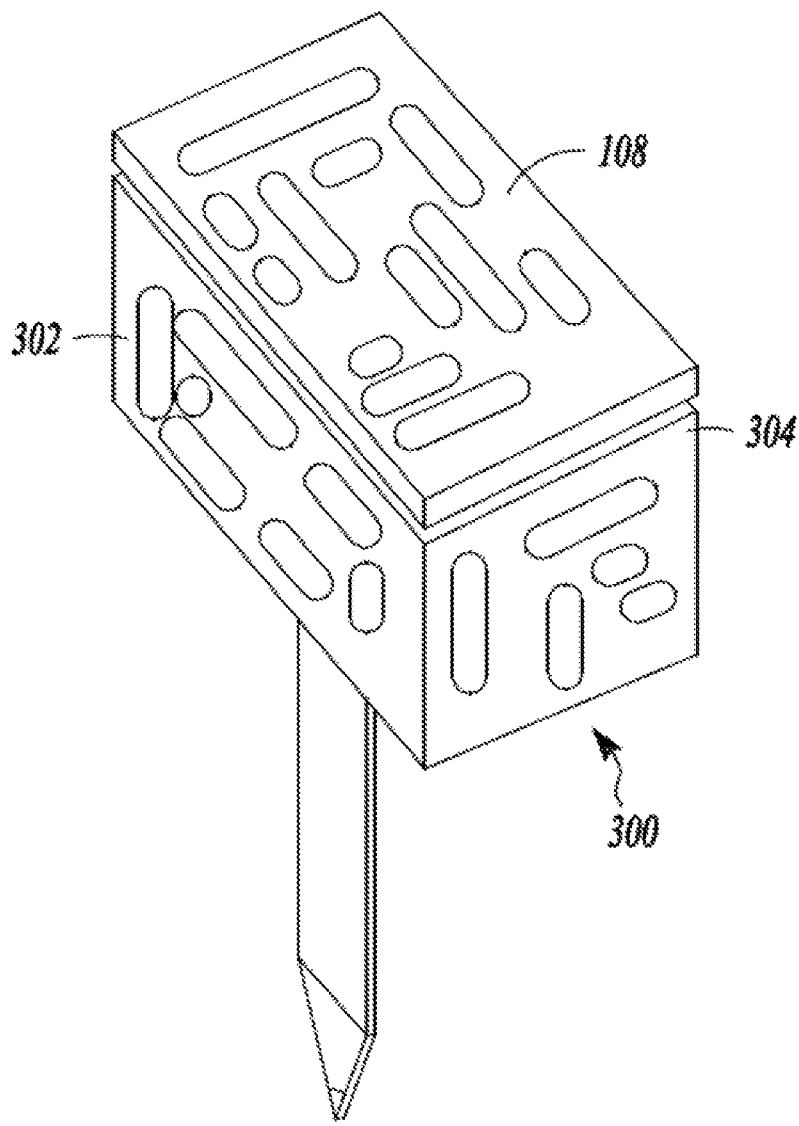
FIG. 3 is a perspective view of an example of a marking device usable for generating digital information and altering digital models of components with same.

FIG. 3 is a perspective view of an example of a marking device usable for generating digital information and altering digital models of components with same. The target 300 of the marking device shown in FIG. 3 includes a plurality of contiguous faces 108 (e.g., the face of the target 108 shown in FIG. 1), 302, 304 positioned in abutting angular contact. The target 300 faces 108, 302, 304 can be configured as a cube attached to an end of the marking device distal to the endpoint that contacts a component. Other locations for faces of target 300 to be coupled to the marking device are also considered to be within the purview of this disclosure. For example, the faces 108, 302, 304 of the target 300 can be axially or radially coupled to body 110. In another example, the faces 108, 302, 304 can be arranged so as to circumferentially surround the body of the marking device or otherwise couple to distinct facets thereof, as applicable based on the geometric structure of the body.

The target 300 can have a number of faces so that an imaging device can effectively track the marking device to determine positions or orientations thereof relative to a component (e.g., X-, Y-, or Z-axis positioning; pitch, yaw, or roll rotations; other positional or orientation changes; or the like or combinations thereof). In some implementations, the outwardly-oriented faces 108, 302, 304 of the target 300 can be sized to a scale that is practical for the given operation and activity of the corresponding marking device. For example, one size of the faces can be 2×2 centimeters.

In some implementations, the faces 108, 302, and 304 can refer to separate targets such that FIG. 3 shows a plurality of targets coupled to a marking device rather than a plurality of faces of a single target coupled to the marking device. In such cases, the pattern elements of the faces of the separate targets 108, 302, 304 can encode a common number to uniquely identify the corresponding marking device, for example, when generating digital information at a computing device based on positions or orientations of the marking device with respect to a component. In some implementations, the faces 108, 302, 304, whether of a single target or multiple targets, can include different layers of color for encoding additional data usable for generating the digital information. For example, respective faces can include colors associated with different metadata for generating digital information such that a user of the marking device can rotate the marking device as desired to cause a desired face to be within the line of sight of the imaging device, thereby causing the corresponding metadata to be included in the digital information generated for the contact of the marking device to the component.

Figure 4:
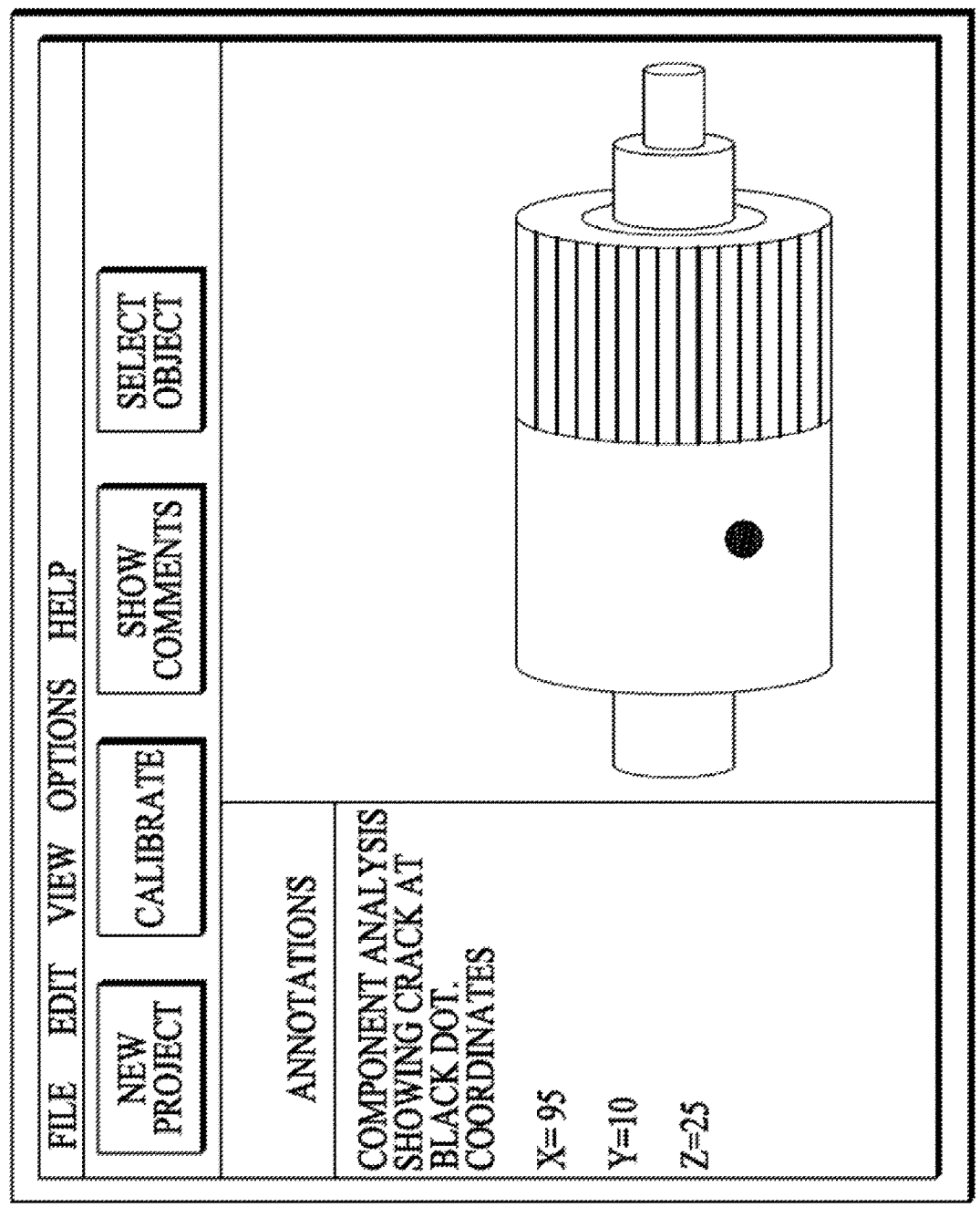
FIG. 4 is an illustration showing an example of a graphical user interface of software usable for altering digital models of components.

FIG. 4 is an illustration showing an example of a graphical user interface 400 of software usable for altering digital models of components, such as the software 200 shown in FIG. 2. The software can include a number of graphical user interfaces for outputting various data to a display of a computing device. In some implementations, the graphical user interface 400 can be a main graphical user interface for the software. The main graphical user interface can include a first frame for showing a digital model of a component, which digital model can be rotated, repositioned, reoriented, or otherwise manipulated within the software based on commands received from an input device, such as a mouse connected to the computing device.

The main graphical user interface can include a second frame for listing the digital information generated for the digital model. The listing of digital information can be organized by category, or type, for example, such that annotations and processing instructions are respectively grouped; by time of generation, such that a first annotation and first processing instruction generated at a first time can be displayed as a first entry of the listing and a second annotation, second processing instruction generated at a second time can be displayed as a second listing, and so on; by area of the component, such as where areas of the component are identified as ranges for altering the digital model such that the digital information generated is grouped by range; or the like or a combination thereof.

In some implementations, the graphical user interface 400 can be configured based on the particular user thereof. For example, the software can include a login mechanism for authenticating access to the software. Upon validating the login credentials of a user (e.g., expressed as a username and password combination), the software can load the graphical user interface 400 according to customizations previously selected by the user. For example, aesthetic features of the graphical user interface 400 such as color or font can be configured by the user. In another example, the type of data displayed on the graphical user interface 400 can be configured such that the digital model is shown separate from a menu usable for calibrating an imaging device and marking device.

The software can include other graphical user interfaces than those shown in FIG. 4. In some implementations, the software can include a graphical user interface for receiving a list of defects detectable for the component associated with the digital model. That graphical user interface can include interface elements for receiving a location of the list from the user (e.g., by the user entering a file path or database name associated with the list). In some implementations, the software can include a graphical user interface to customize how digital information is used to alter a digital model. For example, that graphical user interface can include fields for associating different types of defects with different types of visual depictions, such as line thicknesses, colors, or the like.

In some implementations, the software can include a graphical user interface to calibrate one or more of the imaging device, the marking device, or the component, for example, based on positions or orientations of targets coupled to the marking device or the component detected within a line of sight of the imaging device. In some implementations, the software can include a graphical user interface for measuring positions or orientations of the marking device or the component during the inspection process. This is not to limit the availability or configuration of other possible graphical user interfaces of the software.

In some implementations, the software can include a graphical user interface to calculate estimated costs of repairing a component based on the defects detected with respect thereto. As described elsewhere in this disclosure, detecting a defect of a component using a marking device can include a user of the marking device indicating a region or area of the component that includes the defect and subsequently identifying the type of defect detected. The software can calculate a total area or volume of the region or area (which may be in a two-, three-, or greater-dimensional space). The total area or volume can be multiplied by a value per unit area monetary amount or value per unit volume monetary amount (collectively referred to as the "cost per unit"), as applicable, which cost per unit is previously indicated to the software (e.g., by the user thereof inputting values for costs per unit of respective defects). The estimated costs calculated by the software can be represented in individual values, for example, pertaining to individual defects, or as a total value indicative of the estimated cost to repair all detected defects.

Figure 5:
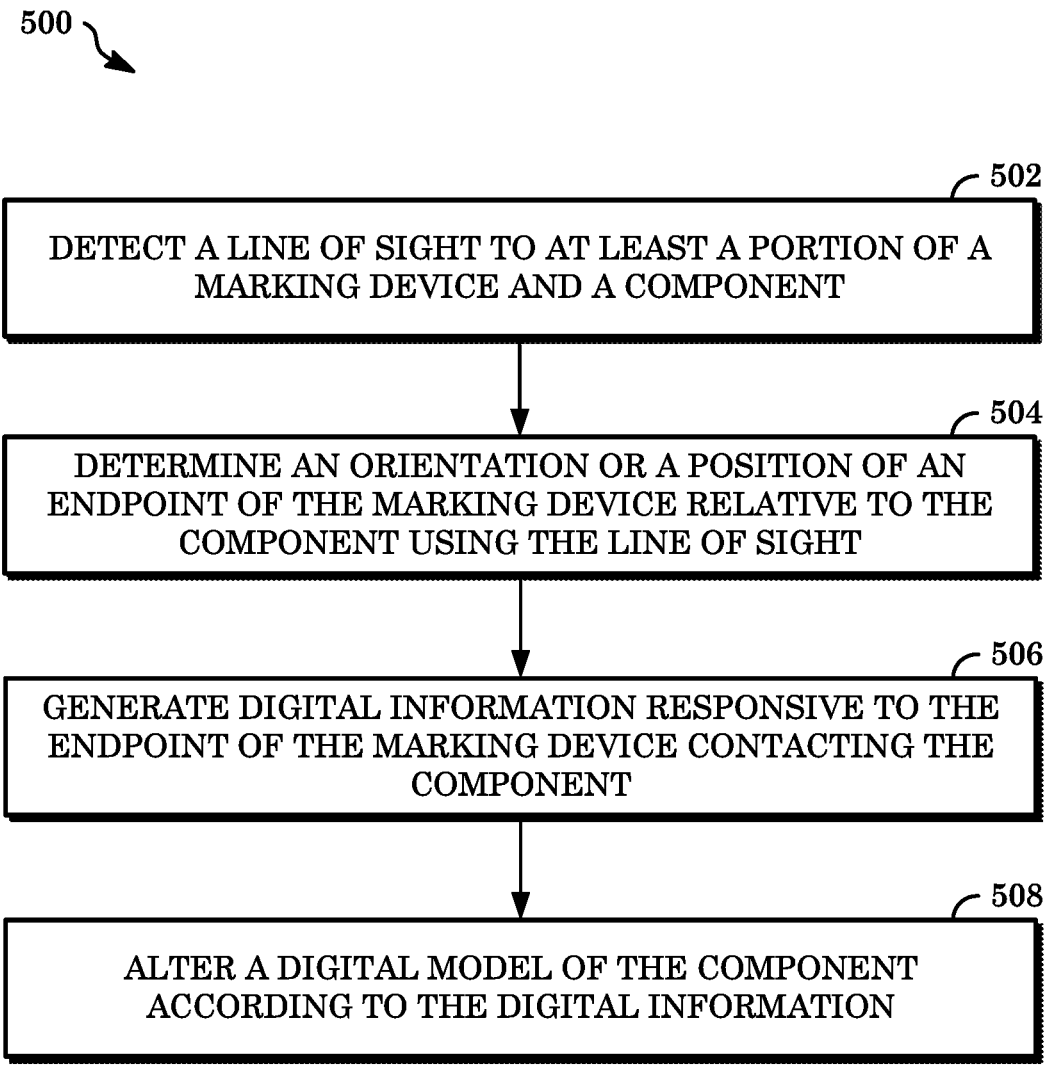
FIG. 5 is a flowchart illustrating an example of a method for generating digital information and annotating digital models of components with same.

FIG. 5 is a flowchart illustrating an example of a method 500 for generating digital information and annotating digital models of components with same. The operations described in connection with the method 500 can be performed at one or more devices, such as the marking device 102, the imaging device 118, or the computing device 124 shown in FIGS. 1 and 2. The operations described in connection with the method 500 can be embodied on a storage device in the form of a non-transitory computer readable storage medium including program instructions executable by one or more processors that, when executed, cause the one or more processors to perform the operations. For example, the operations described in connection with the method 500 could be program instructions stored in a memory of and be executable by a processor of a computing device.

At 502, a line of sight can be detected to at least a portion of a marking device and a component to be inspected. One or both of the marking device or the component can include one or more targets detectable by an imaging device having the detected line of sight. In some implementations, the imaging device can include a plurality of cameras wherein one camera is designated as a master camera and others are designated as slave cameras that extend a line of sight of the master across a wider area. In some implementations, detecting the line of sight at 502 can include preparing a workspace for inspection of a component, such as by configuring an imaging device to detect target positions or orientations in an area of the workspace and configuring a computing device to receive data from the imaging device, a marking device, or the like or a combination thereof.

At 504, a position or orientation (or both) of an endpoint of a marking device relative to a portion of a component to be inspected can be determined within the line of sight. The imaging device having the line of sight discussed at 502 can include one or more cameras in communication with a computing device such that data indicating a position or orientation of the marking device or component can be received and processed by software executing on the computing device. In some implementations, a position or orientation of the component can be determined based on initial values identified for such position or orientation. This assumes that the component does not move. To the extent the component does move, new values for such position or orientation can be calculated based on new position or orientation data determined at a given time. In some implementations, a position or orientation of the marking device can be determined based on an offset calculation between a target of the marking device and a target of the component. Information indicating offsets between relevant points of contact for the component or the marking device and the respective targets can be recorded such that any offset calculations for determining positions or orientations of the component or the marking device can take those recorded data into account.

In some implementations, determining a position or orientation of the marking device relative to the component can include calculating positions or orientations of an endpoint of the marking device and a portion of the component contacted by the endpoint. The calculating can include determining a set of coordinates representing points of contact between the endpoint and the portion of the component in a multi-dimensional space. The coordinates of the sets form points of a point cloud representing the respective points of contact between the endpoint and the portion, or other points in a multi-dimensional space at which the endpoint is disposed. A surface of the point cloud lateral to the surface of the component including the contacted portion can be projected to such surface of the component, such that a region of such surface of the component can be indicated in the digital information to be generated for the contact as the region of the digital model to subsequently be altered based on the defect corresponding to the contact.

For example, a user of the marking device can toggle a user interface element (e.g., a button on the marking device) to start recording the multi-dimensional locations and orientations of the endpoint thereof. Software receiving the positional and orientation data can be configured to identify a multi-dimensional location or orientation at discrete intervals of time (e.g., every tenth of a second). Alternatively, the software can identify new multi-dimensional location or orientation data about the endpoint of the marking device responsive to detecting that a position or orientation thereof has changed from corresponding, previously identified values. Regardless of the particular manner in which the position or orientation data is recorded, a point cloud will be generated based on the identified positions and orientations, which point cloud is comprised of a number of polygons, such as triangles. The corners of the point cloud polygons can be projected to a surface of the digital model of the component that most closely corresponds to the location of such corner. The software iterates through the polygons of the point cloud until a sufficient number have been projected such that an annotation can be made to alter the digital model. The user of the marking device can than toggle the user interface element again to stop the recording of the multi-dimensional location and orientation data.

In some implementations, coordinates representing locations of points of a component in a multi-dimensional space can be input to the computing device processing the determining of 504 as a threshold operation for the determining. For example, one or more points on the component can be contacted by the marking device as an initial step for registering the component with software executing on the computing device. A coordinate representing the location of the point can be recorded and mapped to a corresponding point of the digital model. Multiple points can be registered in this way such that multiple corresponding points of the digital model can be mapped to those multiple points contacted on the component. Such mappings can be used to verify that corresponding locations of the component and the digital model are recognized so that points of the component later contacted for generating digital information will reflect correct data for the location of the digital model to be altered thereby.

At 506, digital information can be generated. The generation of digital information can be responsive to an endpoint of the marking device contacting a portion of the component. In some implementations, data indicative of the contact (e.g., the position or orientation of the endpoint or portion relative to one another) can be automatically transmitted to a computing device for processing and generating digital information upon the occurrence of the contact. In some implementations, data used to generate the corresponding information can be generated responsive to the computing device receiving a command (e.g., from a user, directly into the computing device or indirectly via the marking device) to generate the digital information. In some implementations, generating digital information can include establishing or defining configurations of the digital information for when the digital information is later applied to a digital model of the component, for example, to specify how various contacts between the endpoint and the portion are visually represented on the digital model based on the nature of the defect or other factors.

At 508, a digital model of the component under inspection is altered according to the digital information generated at 506. The digital information can include positional information indicating a location of the digital model to be altered thereby, as well as data indicating the nature of the alteration (e.g., the size, shape, color, or the like). Altering the digital model can include generating alterations corresponding to the digital information in graphical layers that can be applied to the digital model. In this way, alterations made to a digital model can be selectively viewed on top of the original, unaltered form of the digital model. In some implementations, altering the digital model according to the digital information can include associating a processing instruction or comment received in connection with the digital model with all or a portion of the digital model. In some implementations, altering the digital model can include reconciling the digital information with a list of defects or other source of information for indicating the types of data to be reflected by the alteration or the manner in which to effect the alteration. For example, altering the digital model based on a scratch can include software executing on the computing device identifying a configuration for visually representing scratches for the component such that the alteration is made using the configured settings.

Implementations of the method 500 can include additional, less, combinations of, or other functionality than as described above. In some implementations, the method 500 can include receiving a digital file including a digital model representing a component in a multi-dimensional space. The digital file can be a CAD-type file, such as an STL file, stored in the memory of a computing device executing the software that receives the digital file or in the memory of a different computing device or data storage unit (e.g., a server operating a database). In some implementations, the method 500 can include calibrating an orientation or position of a target of a marking device with a target of a component, or calibrating one or both of a target of a marking device or a target of a component with an imaging device. The calibrating can include identifying initial positions or orientations of devices to which the targets are coupled and differences in positions or orientations between those devices.

All or a portion of the implementations of the systems and techniques described herein can be implemented using a general-purpose computer/processor with a computer program that, when executed, carries out any of the respective techniques, algorithms, or instructions described herein. In addition, or alternatively, for example, a special-purpose computer/processor can be utilized which can contain specialized hardware for carrying out any of the techniques, algorithms, or instructions described herein.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the systems and methods described herein or their features may have different names, formats, or protocols. Further, the system may be implemented via a combination of hardware and software, as described, or entirely in hardware elements. Also, the particular division of functionality between the various system components described herein is merely by example, and not mandatory; functions performed by a single system component may instead be performed by multiple components, and functions performed by multiple components may instead performed by a single component.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clearly indicated by the context to be directed to a singular form. Moreover, use of the term "an implementation" or the term "one implementation" throughout this disclosure is not intended to mean the same implementation unless described as such.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

The use of the terms "a," "an," "the," or similar referents in the context of describing the systems and techniques (especially in the context of the following claims) should be construed to cover both the singular and the plural. Furthermore, unless otherwise indicated herein, the recitation of ranges of values herein is intended merely to serve as a shorthand alternative to referring individually to respective separate values falling within the ranges, and respective separate values are incorporated into the specification as if individually recited herein. Finally, the operations of all techniques described herein are performable in any suitable order unless clearly indicated otherwise by the context. The use of any and all examples, or language suggesting that an example is being described (e.g., "such as"), provided herein is intended merely to better illuminate the systems and techniques and does not pose a limitation on the scope of the systems and techniques unless otherwise claimed.

All references, including publications, patent applications, and patents, cited herein are hereby incorporated by reference to the same extent as if respective references were individually and specifically indicated as incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

What is claimed is:

1. A system for generating digital information associated with a component and altering a digital model of the component using the digital information, the system comprising:
a marking device including an interface element and an endpoint disposed at an end of an elongate body; and
a computing device including a memory, a processor, a display, and an imaging device, wherein the memory includes instructions executable by the processor to:
retrieve the digital model of the component from a first digital file;
output the digital model of the component to the display before use of the marking device begins in connection with the component, wherein the digital model is a computerized visual representation of the component in three-dimensional space;
determine at least one of an orientation or a position of the endpoint relative to the component detected using a line of sight of the imaging device;
receive, responsive to a user of the marking device toggling the interface element of the marking device, speech input associated with a portion of the component when the at least one of the orientation or the position of the endpoint correspond to a location of the portion of the component on the digital model in the three-dimensional space;
generate the digital information based on the speech input, wherein the digital information includes one or more annotations for visually altering the digital model;
store the digital information in a markup language format within a second digital file separate from the first digital file; and
output an altered digital model of the component to the display by retrieving the digital information from the second digital file and displaying the retrieved digital information as a first graphical layer on top of a second graphical layer including the digital model, wherein manipulation of the altered digital model includes manipulation of the first graphical layer together with the second graphical layer.

2. The system of claim 1, wherein a first target is coupled to the marking device and a second target is coupled to the component.

3. The system of claim 2, wherein at least one of the first target or the second target includes a retroreflective fabric detectable by the imaging device.

4. The system of claim 2, wherein the instructions to determine the at least one of the orientation or the position of the endpoint relative to the component using the line of sight of the imaging device include instructions executable by the processor to:
calibrate at least one of an orientation or a position of the first target relative to the second target; and
calculate the at least one of the orientation or the position of the endpoint relative to the component based on offsets between orientations or positions of the first target to the endpoint and the second target to a portion of the component contacted by the endpoint.

5. The system of claim 2, wherein the instructions to generate the digital information based on the speech input include instructions executable by the processor to:
determine a correspondence between the at least one of the orientation or position of the endpoint of the marking device and the portion of the component; and
process the speech input using speech recognition functionality to associate the portion of the component with a defect of a list of defects detectable for the component,
wherein the digital information includes data associating the defect and the portion of the component.

6. The system of claim 5, wherein the instructions to determine the correspondence between the at least one of the orientation or position of the endpoint of the marking device and the portion of the component include instructions executable by the processor to:
determine a set of coordinates representing correspondences between locations of the endpoint of the marking device in a multi-dimensional space and portions of the component in the multi-dimensional space, wherein the set of coordinates forms a point cloud;
project a surface of the point cloud to a surface of the component corresponding to the set of coordinates; and
identify the portion of the component associated with the correspondence between the at least one of the orientation or position of the endpoint of the marking device and the portion of the component as at least a portion of the surface of the point cloud.

7. The system of claim 1, wherein the endpoint of the marking device receives an adapter to facilitate contact between the endpoint and the component.

8. A method for generating digital information associated with a component and altering a digital model of the component using the digital information, the method comprising:
retrieving the digital model of the component from a first digital file;
outputting the digital model of the component to a display before use of a marking device begins in connection with the component, wherein the digital model is a computerized visual representation of the component in three-dimensional space;
detecting a line of sight to at least a portion of the marking device and the component;
determining at least one of an orientation or a position of an endpoint of the marking device relative to the component using the line of sight;
receiving, responsive to a user of the marking device toggling an interface element of the marking device, speech input associated with a portion of the component when the at least one of the orientation or the position of the endpoint correspond to a location of the portion of the component on the digital model in the three-dimensional space;
generating the digital information based on the speech input, wherein the digital information includes one or more annotations for visually altering the digital model;
storing the digital information in a markup language format within a second digital file separate from the first digital file; and
outputting an altered digital model of the component to the display by retrieving the digital information from the second digital file and displaying the retrieved digital information as a first graphical layer on top of a second graphical layer including the digital model, wherein manipulation of the altered digital model includes manipulation of the first graphical layer together with the second graphical layer.

9. The method of claim 8, wherein a first target is coupled to the portion of the marking device and a second target is coupled to the component.

10. The method of claim 9, wherein at least one of the first target or the second target includes a retroreflective fabric detectable by an imaging device.

11. The method of claim 9, wherein determining the at least one of the orientation or the position of the endpoint of the marking device relative to the component using the line of sight comprises:
calibrating at least one of an orientation or a position of the first target relative to the second target; and
calculating the at least one of the orientation or the position of the endpoint relative to the component based on offsets between orientations or positions of the first target to the endpoint and the second target to a portion of the component contacted by the endpoint.

12. The method of claim 9, wherein generating the digital information based on the speech input comprises:
determining a correspondence between the at least one of the orientation or position of the endpoint of the marking device and the portion of the component; and
processing the speech input using speech recognition functionality to associate the portion of the component with a defect of a list of defects detectable for the component,
wherein the digital information includes data associating the defect and the portion of the component.

13. The method of claim 12, wherein determining the correspondence between the at least one of the orientation or position of the endpoint of the marking device and the portion of the component comprises:
determining a set of coordinates representing correspondences between locations the endpoint of the marking device in a multi-dimensional space and portions of the component in the multi-dimensional space, wherein the set of coordinates forms a point cloud;
projecting a surface of the point cloud to a surface of the component corresponding to the set of coordinates; and
identifying the portion of the component associated with the correspondence between the at least one of the orientation or position of the endpoint of the marking device and the portion of the component as at least a portion of the surface of the point cloud.

14. The method of claim 8, wherein the endpoint of the marking device receives an adapter to facilitate contact between the endpoint and the component.

15. A system for generating digital information associated with a component and altering a digital model of the component using the digital information, the system comprising:
a marking device including an interface element, an endpoint disposed at an end of an elongate body, and a first target coupled to the elongate body;
an imaging device including a line of sight detecting the first target and a second target coupled to the component; and
a computing device including a display, a memory, and a processor, wherein the memory includes instructions executable by the processor to:
retrieve the digital model of the component from a first digital file;
output the digital model of the component to the display before use of the marking device begins in connection with the component, wherein the digital model is a computerized visual representation of the component in three-dimensional space;
calibrate the first target to the second target based on positions and orientations of the marking device and the component detected in the line of sight;
determine a correspondence between a location of the endpoint in a multi-dimensional space and a location of a portion of the component in the multi-dimensional space based on positions and orientations of the endpoint with respect to the portion of the component detected using the calibrated first and second targets;
receive, responsive to a user of the marking device toggling the interface element of the marking device, a command to associate the portion of the component with a defect of a list of defects detectable for the component based on the determined correspondence between the location of the endpoint in the multi-dimensional space and the location of the portion of the component in the multi-dimensional space;
generate the digital information based on the command to indicate an association between the portion of the component and the defect, wherein the digital information includes one or more annotations for visually altering the digital model;
store the digital information in a markup language format within a second digital file separate from the first digital file; and
output an altered digital model of the component to the display by retrieving the digital information from the second digital file and displaying the retrieved digital information as a first graphical layer on top of a second graphical layer including the digital model, wherein manipulation of the altered digital model includes manipulation of the first graphical layer together with the second graphical layer.

16. The system of claim 15, wherein the instructions to determine the correspondence between the location of the endpoint the multi-dimensional space and the location of the portion of the component the multi-dimensional space based on the positions and orientations of the endpoint with respect to the portion of the component detected using the calibrated first and second targets include instructions executable by the processor to:
determine a set of coordinates representing correspondences between locations of the endpoint of the marking device in the multi-dimensional space and locations of portions of the component in the multi-dimensional space, wherein the set of coordinates forms a point cloud;
project a surface of the point cloud to a surface of the component corresponding to the set of coordinates; and
identify the portion of the component contacted by the endpoint as at least a portion of the surface of the point cloud.

17. The system of claim 15, wherein entries of the list of defects detectable for the component include associated metadata indicating a technique for altering portions of the digital model based on corresponding defects, and wherein portions of the associated metadata can be included in the command such that the digital information can be generated to include the portions of the associated metadata.

18. The system of claim 15, wherein speech input received responsive to the user of the marking device toggling the interface element of the marking device is processed using speech recognition functionality to determine the command.

19. The system of claim 1, wherein the instructions to output an altered digital model of the component to the display by retrieving the digital information from the second digital file and displaying the retrieved digital information as a first graphical layer on top of a second graphical layer including the digital model include instructions executable by the processor to:

selectively toggle, based on input received from the user of the marking device, on or off the display of the first graphical layer, wherein the first graphical layer and the second graphical layer are displayed together when the display of the first graphical layer is toggled on, wherein the second graphical layer alone is displayed when the display of the first graphical layer is toggled off.

20. The method of claim 8, wherein outputting an altered digital model of the component to the display by retrieving the digital information from the second digital file and displaying the retrieved digital information as a first graphical layer on top of a second graphical layer including the digital model comprises:

selectively toggling, based on input received from the user of the marking device, on or off the display of the first graphical layer, wherein the first graphical layer and the second graphical layer are displayed together when the display of the first graphical layer is toggled on, wherein the second graphical layer alone is displayed when the display of the first graphical layer is toggled off.

* * * * *